United States Patent [19]

Takaoka

[11] Patent Number: 5,687,922
[45] Date of Patent: Nov. 18, 1997

[54] PULVERIZER

[75] Inventor: Shoji Takaoka, Nagoya, Japan

[73] Assignee: Nipponkoatsudenki Kabushikikaisha, Japan

[21] Appl. No.: 539,927

[22] Filed: Oct. 6, 1995

[30] Foreign Application Priority Data

| Oct. 12, 1994 | [JP] | Japan | 6-272819 |
| Dec. 2, 1994 | [JP] | Japan | 6-329360 |
| Jun. 2, 1995 | [JP] | Japan | 7-160115 |

[51] Int. Cl.$^6$ ............................................. B02C 19/08
[52] U.S. Cl. .................... 241/259; 241/259.1; 241/261.1
[58] Field of Search .......................... 241/169.2, 261.1, 241/258, 259, 257.1, 259.2, 259.1, 259.3

[56] References Cited

U.S. PATENT DOCUMENTS

| 2,342,252 | 2/1944 | Claybourn et al. | 241/257.1 X |
| 4,196,224 | 4/1980 | Falk | 241/261.1 X |

FOREIGN PATENT DOCUMENTS

| 337360 | 5/1921 | Germany | 241/258 |
| 601134 | 8/1934 | Germany | 241/257.1 |
| 650659 | 9/1937 | Germany | 241/257.1 |
| 2012405 | 5/1994 | U.S.S.R. | 241/261.1 |

*Primary Examiner*—Mark Rosenbaum
*Attorney, Agent, or Firm*—William A. Drucker

[57] ABSTRACT

A pulverizer used to pulverize tea leaves, grain such as sesame and wheat, and minerals such as ceramics and rocks. A pair of upper and lower mortars provided for the pulverizer are rotated relatively to pulverize material between the pulverizing surface provided on the top surface of the lower mortar and the pulverizing surface provided on the bottom surface of the upper mortar. The pulverizing surface of the lower mortar is formed in a concave conical shape and the pulverizing surface of the upper mortar is formed in a conical shape matching the concave conical shape. Accordingly, when pulverization is performed between the pulverizing surfaces of the upper and lower mortars, the material is raised along the pulverizing surface of the lower mortar toward its outer peripheral section and slips down along the pulverizing surface, returning toward its central section. This up-and-down movement is repeated. The material can therefore be retained for an extended period of time between the pulverizing surfaces. As a result, the material can be ground down into powder having a small grain size.

7 Claims, 10 Drawing Sheets

PULVERIZER

BACKGROUND OF THE INVENTION

1. Field of the invention

The present invention relates to a pulverizer used to pulverize tea leaves, and grain such as sesame and wheat.

2. Description of the Prior Art

Tea is not only a taste food but is enjoyed as a healthy food. Tea is rich in vitamins and minerals. But when the tea is brewed from the tea leaves, the greater part of the nutriment is left in the used tea leaves, without being ingested. Therefore, if the tea leaves are ground to a powder and the tea is brewed from the powder, the greater part of said nutriment can be ingested.

As a pulverizer for grinding the tea leaves to form powdered tea, a stone mill is conventional. The stone mill is constituted as follows. An upper mortar having a flat pulverizing surface on its bottom surface is placed over a lower mortar having a flat pulverizing surface on its top surface so that the upper mortar can rotate around its vertical axis, with the pulverizing surface of the upper mortar facing the pulverizing surface of the lower mortar.

In such a pulverizer, while the upper mortar is rotated, material to be pulverized is supplied to a gap between the pulverizing surfaces of both mortars through a material supply hole provided near the central section of the upper mortar. The supplied material is then moved in the outer peripheral direction while the material is pulverized by the pulverizing surfaces of the upper and lower mortars. In this case, the material is moved in only one direction from the inner peripheral side to the outer peripheral side through the gap between the pulverizing surfaces of the upper and lower mortars. During the movement, the material is ground down by both pulverizing surfaces into powder. The powder is discharged directly from the outer peripheral edges of both mortars.

In the pulverizer described above, since the material passes through the gap between both pulverizing surfaces only once, the pulverizer can be used suitably to obtain powder having a relatively large grain size. However, to grind down the material into powder having a small grain size, it is necessary to increase the diameters of the pulverizing surfaces of the upper and lower mortars so that the time during which the material is ground can be extended. Eventually, the upper and lower mortars need to be made larger.

As a pulverizer different from the above-mentioned machine, a pulverizer is known in which a movable mortar having a conical pulverizing surface is provided rotatably around the horizontal axis and opposed to a horizontal stationary mortar having a concave conical pulverizing surface, with the conical pulverizing surface matching and facing the concave conical pulverizing surface.

In this type of pulverizer, the movable mortar is rotated and the material to be pulverized is supplied from around the bottom of the concave conical pulverizing surface of the stationary mortar to the gap between the pulverizing surfaces of both mortars. While being pulverized by the pulverizing surfaces of both mortars, the supplied material is moved gradually to the lowest side of the outer peripheral section of the concave conical pulverizing surface. In this case, since the lowest section of the outer peripheral section of the concave conical pulverizing surface is lower than the bottom of the pulverizing surface, the material is ground by the pulverizing surfaces into powder while being moved smoothly and reaches the lowest section of the outer peripheral section. The powder having reached the lowest section is discharged directly.

In this type of pulverizer, since the material smoothly passes through the gap between the pulverizing surfaces as described above, the pulverizer can be used suitably to efficiently pulverize the material into powder having a relatively large grain size.

SUMMARY OF THE INVENTION

An object of the present invention is to provide a pulverizer which can grind down material between the pulverizing surfaces of a pair of mortars into powder.

Another object of the invention is to provide a pulverizer which can grind down material into fine powder.

A still another object of the invention is to provide a pulverizer which can grind down material into fine powder by using a compact mortar.

In the pulverizer of the invention, the pulverizing surface of its lower mortar has a concave conical shape in which the outer peripheral section of the pulverizing surface of the lower mortar is higher than the central section. For this reason, when material is pulverized between the pulverizing surfaces of the upper and lower mortars, the material is raised along the pulverizing surface of the lower mortar to its outer peripheral section and slips down along the pulverizing surface, returning to the central section. This up-and-down movement is repeated. The material is thus retained in the gap between the pulverizing surfaces for an extended period of time and is ground down for an extended period of time. As a result, the material can be ground down into fine powder. In addition, since the material is raised to the outer peripheral section and returned to the central section repeatedly as described above, the above-mentioned long-time grinding is possible by using lower and upper mortars having small diameters. This makes it possible to miniaturize the pulverizer.

A further object of the invention is to provide a pulverizer which can change the grain size of powder when material is ground into powder having a small grain size.

A still further object of the invention is to provide a pulverizer capable of continuously pulverizing a large amount of material.

A yet another object of the invention is to provide a pulverizer capable of continuously pulverizing a large amount of material as described above without making the size of the pulverizer larger.

DESCRIPTION OF THE PREFERRED EMBODIMENTS

Figure 1:
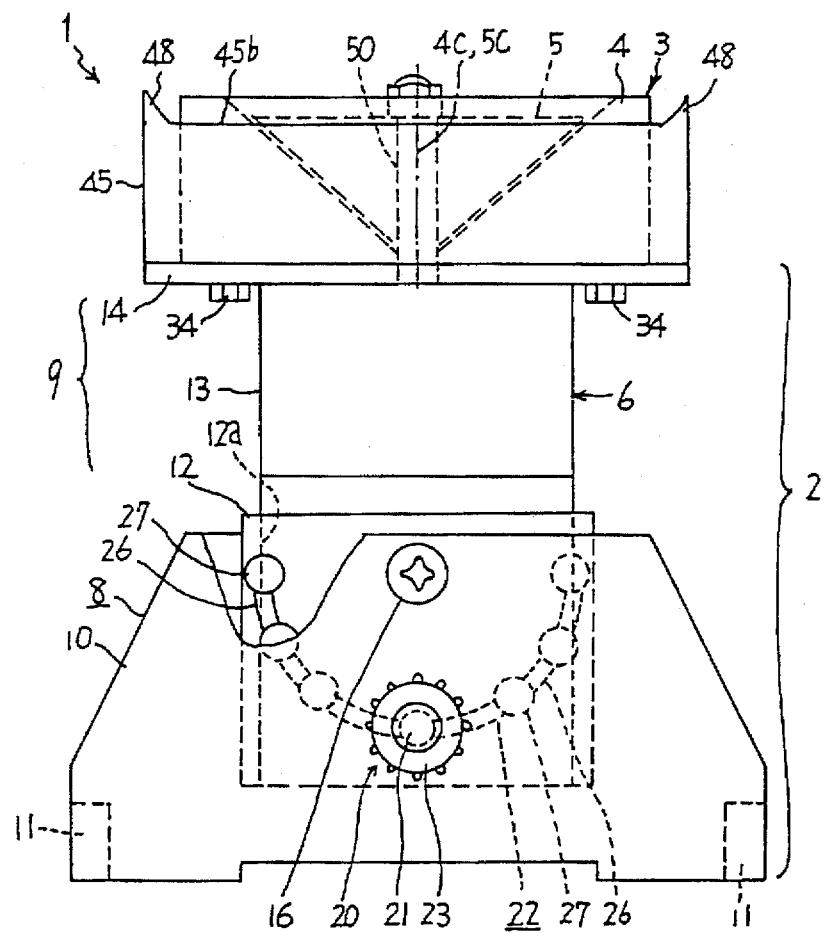
FIG. 1 is a partial cutaway front view showing a pulverizer of a first embodiment of the present invention.
Figure 2:
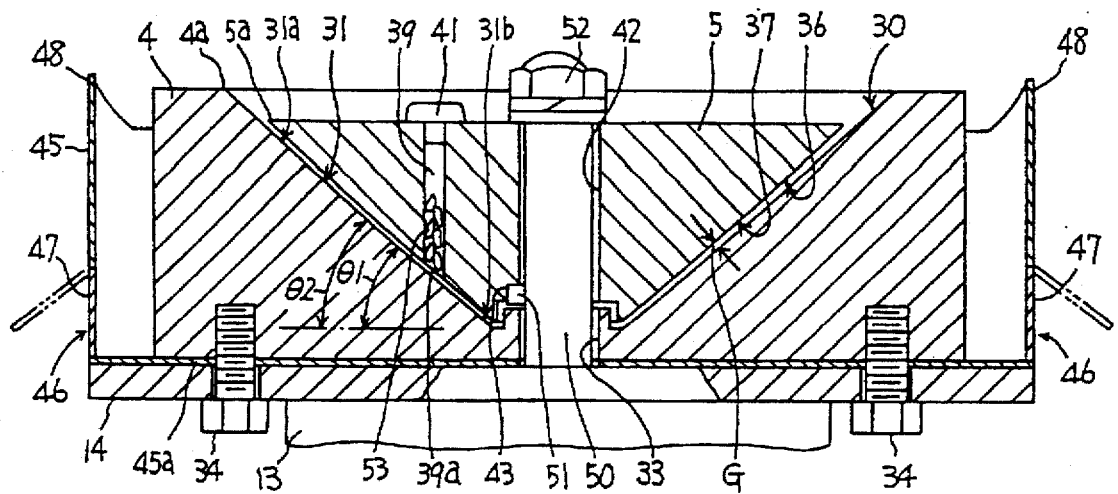
FIG. 2 is an enlarged vertical sectional view showing the main section of the pulverizer shown in FIG. 1.
Figure 3:
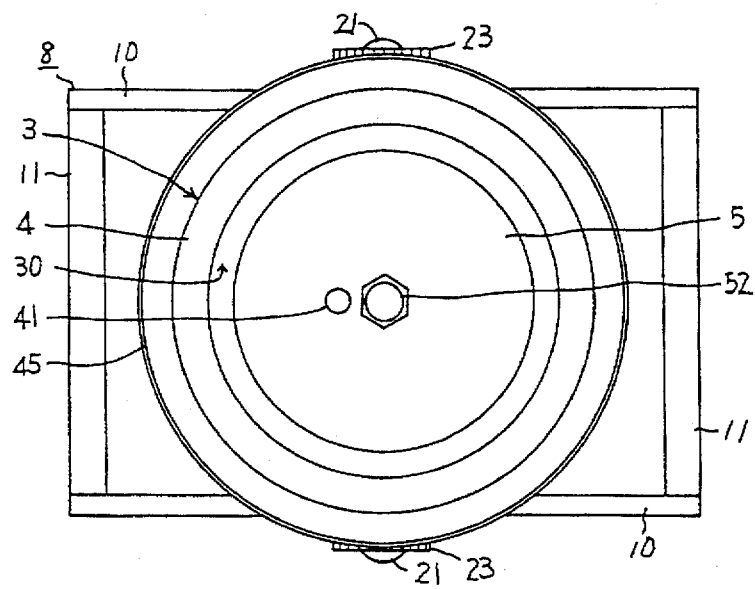
FIG. 3 is a plan view of the pulverizer shown in FIG. 1.
Figure 4:
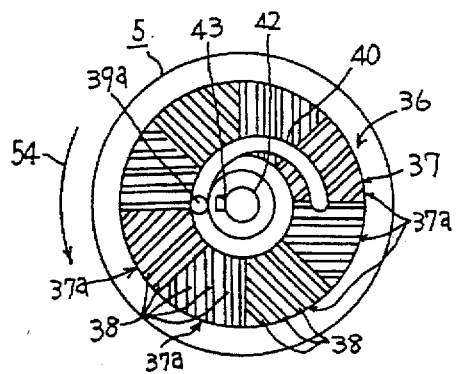
FIG. 4 is a bottom view showing an upper mortar.
Figure 5:
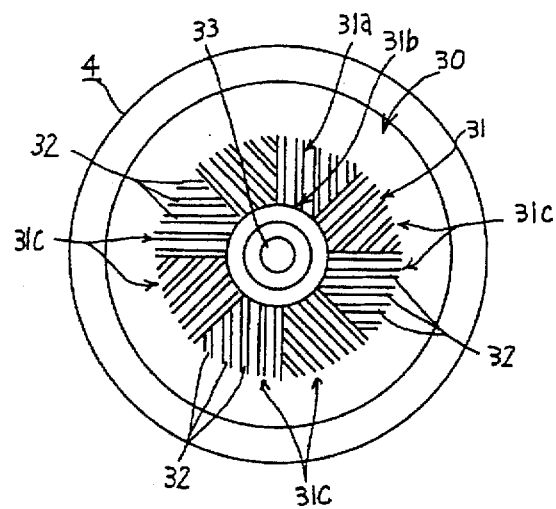
FIG. 5 is a plan view showing a lower mortar.
Figure 6:
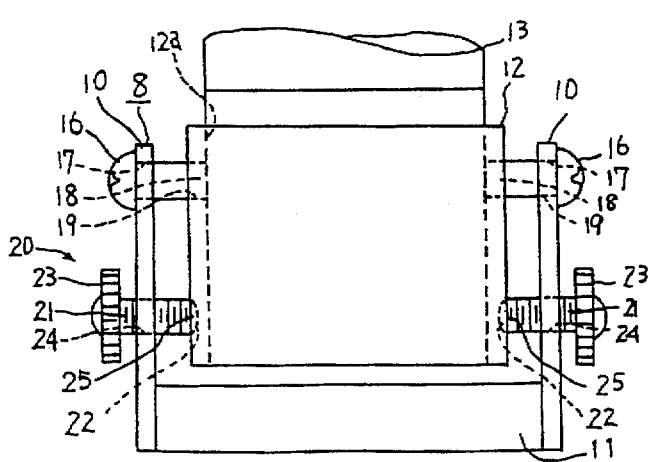
FIG. 6 is a side view showing an angle adjustment mechanism.

Referring to FIGS. 1 to 7 showing a pulverizer of a first embodiment of the present invention, a pulverizer 1 has a base frame 2. The base frame 2 is provided with a pair of mortars 3 comprising a lower mortar 4 and an upper mortar 5, and a drive unit 6 for rotating the upper mortar 5 as a means for relatively rotating the lower mortar 4 and the upper mortar 5. First, the base frame 2 is described below. The base frame 2 comprises a support base 8 for placing the machine on the top surface of a table or the like and a movable frame 9 which can be inclined with respect to the support base 8 to incline the lower mortar 4 and the upper mortar. The support base 8 comprises a pair of front and rear side plates 10, 10 and connection members 11 for connecting them as shown in FIGS. 3 and 6. The movable frame 9 comprises an accommodation case 12, a motor case 13 and a mounting base 14. The accommodation case 12 is formed in the shape of a square box in plan view and has a holding section 12a for holding the motor case 13 at its central section. As the holding section 12a, a concave section is exemplified in which the lower half of the motor case 13 can be fit from above. As the motor case 13, the case of a geared motor used as the drive unit 6 is exemplified. The mounting base 14 is a base on which the lower mortar 4 and a saucer 45 described later are mounted. It is a flat plate secured to the motor case 13.

Next, the structure for mounting the accommodation case 12 on the support base 8 is described below referring to FIGS. 1 and 6. The accommodation case 12 is pivotally mounted on the side plates 10 of the support base 8 by support pins 16 so that the movable frame 9 can be inclined with respect to the support base 8. For example, the support pin 16 is screwed in a threaded hole 17 provided in the side plate 10 and the tip 18 thereof is fit in a hole 19 provided on the outer surface of the side wall of the accommodation case 12. Numeral 20 designates an angle adjustment mechanism for adjusting the inclination angle of the movable frame 9 with respect to the support base 8. The mechanism 20 comprises an angle change pin 21 and an angle change groove 22 formed on the flat outer surface of the side wall of the accommodation case 12. As the angle change pin 21, a screw rod is exemplified which is provided with a knob 23 at the base section of the pin 21 to allow manual rotation operation. The angle change pin 21 is screwed into a threaded hole 24 provided on the side plate 10, and its tip 25 is positioned in the angle change groove 22. The angle change groove 22 has a receiving section 26 for receiving the pushing force from the tip of the angle change pin 21. By departing the tip 25 of the angle change pin 21 from the receiving section 26, the accommodation case 12 can be inclined as desired around the support pin 16 with respect to the support base 8. By rotating the angle change pin 21, the tip 25 is pushed against the receiving section 26. The accommodation case 12 can thus be secured to the support base 8 at a desired inclination angle. The receiving section 26 has the shape of a shallow groove formed in a circular arc centered at the position of the support pin 16. The length of the receiving section 26 has been determined so that the accommodation case 12 can be secured at any position in the range of 90 degrees right and left from the position shown in FIG. 1. Securing sections 27 for more firmly securing the accommodation case 12 to the support base 8 at a predetermined angle are formed at appropriate intervals along the receiving section 26. The securing section 27 formed in the shape of a hole, the depth of which is greater than that of the receiving section 26 so that the tip 25 of the angle change pin 21 can fit therein, is exemplified herein. It is not always necessary to provide the securing section 27. The angle adjustment mechanism may be a gear mechanism or latch mechanism provided on the pivoting section (the section supported by the support pin 16) of the accommodation case 12 for angle change thereof.

Next, the lower mortar 4 and the upper mortar 5 are described below referring to FIGS. 2, 4 and 5. The top surface 30 of the lower mortar 4 has a concave conical shape at its central section, except its peripheral section. At the central section, a pulverizing surface 31 is formed. Since the pulverizing surface 31 has a concave conical shape, when the center line 4c of the lower mortar 4 is set in the vertical direction as shown in FIG. 1, the outer peripheral section 31a of the pulverizing surface 31 is positioned higher than the central section 31b. The slope angle θ1 (an angle formed by the horizontal plane and the pulverizing surface 31 when the center line 4c of the lower mortar 4 is set in the vertical direction) of the pulverizing surface 31 is about 40 degrees, for example in the case of this embodiment. However, the slope angle may be determined to have a larger or smaller value as described later. The pulverizing surface 31 is divided into a plurality of segments 31c in the peripheral direction as shown in FIG. 5. In each segment, a plural stripes of grooves 32 are formed in parallel in the direction shown in the figure so that material to be pulverized can be moved easily from the central section to the outer peripheral section of the pulverizing surface 31. A through hole 33 for allowing the rotation shaft of the drive unit 6 to be inserted is formed at the central section of the lower mortar 4. The lower mortar 4 is mounted on the mounting base 14 with bolts 34.

Next, the upper mortar 5 is formed so that the upper end 5a thereof is positioned slightly lower than the upper end 4a of the lower mortar 4. The bottom surface 36 of the upper mortar 5 has a conical shape matching the concave conical shape of the top surface 30 of the lower mortar 4. On the bottom surface 36, a pulverizing surface 37 is formed, which matches the pulverizing surface 31. As shown in FIG. 4, the pulverizing surface 37 is divided into a plurality of segments 37a just as in the case of the pulverizing surface 31. Grooves 38 are formed on each segment. In the upper mortar 5, a material supply hole 39 for supplying material to be pulverized to the pulverizing surface 37 is provided at a position near the axial center of the upper mortar 5 to supply the material as close as possible to the central section of the pulverizing surface 37. Furthermore, on the bottom surface 36, a material guide groove 40 for guiding the supplied material to the pulverizing surface 37 is formed in communication with the lower end 39a of the supply hole 39. The material guide groove 40 is formed in a spiral shape to disperse the material over the pulverizing surface 37 as widely as possible. Numeral 41 designates a plug for plugging the material supply hole 39 to prevent the material from dropping from the supply hole 39. The plug 9 is made of rubber or synthetic resin. A through hole 42 provided at the central section of the upper mortar 5 is used to allow the rotation shaft of the drive mechanism 6 to pass. At a portion of the peripheral edge of the lower end of the through hole 42, a concave fitting section 43 is formed to accommodate a projection piece provided for transmitting the rotation drive power on the rotation shaft. The upper mortar 5 having the above-mentioned structure is set so that its pulverizing surface 37 faces the pulverizing surface 31 of the lower mortar 4, with a slight gap G interposed therebetween for pulverizing the material. Since the gap G for pulverizing the material is also formed by the grooves 32, 38 provided on the pulverizing surfaces 31, 37 respectively, the portions other than the grooves 32 on the pulverizing surface 31 may contact the portions other than the grooves 38 on the pulverizing surface 37, unless the rotation of the upper mortar 5 is interfered.

The above-mentioned lower mortar 4 and the upper mortar 5 are made of metal, such as cast iron. However, they may be made of ceramics, such as alumina porcelain, ordinary porcelain or other ceramics, or they may be made of metal and their pulverizing surfaces 31 and 37 may be coated with ceramics superior in wear resistance and heat resistance. These materials are easy to obtain and to form, so that the cost of manufacturing can be reduced. Mortars made of ceramics or coated with ceramics are preferable, since they can properly keep the taste of material to be pulverized, such as tea leaves.

Figure 7:
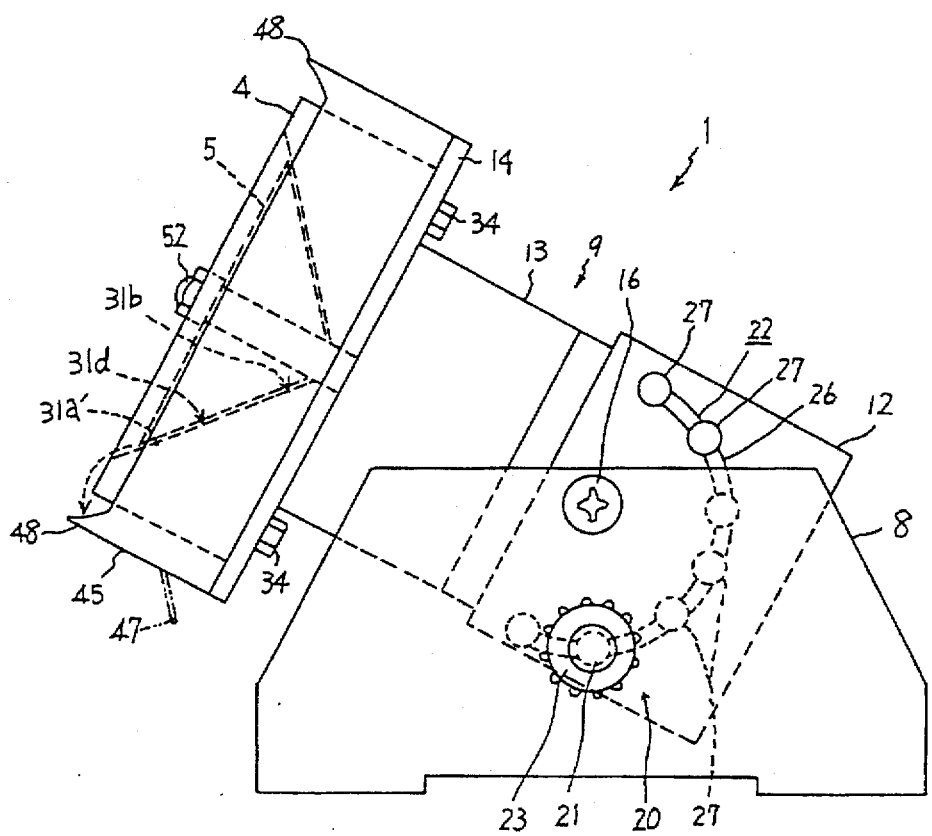
FIG. 7 is a front view of the pulverizer in an inclined condition.

Next, numeral 45 designates a saucer used to receive powder discharged from the gap between the upper mortar 5 and the lower mortar 4. In this embodiment, the saucer 45 is mounted on the mounting base 14 by placing the bottom plate 45a of the saucer 45 between the mounting base 14 and the lower mortar 4. In the saucer 45, the portions thereof which are positioned downward when the movable frame 9 is inclined as shown in FIG. 7 or opposite side, that is, the left-end and right-end portions shown in FIG. 2 are provided with outlets 46 from which the material is taken out. The outlets 46 are equipped with lids 47 which are openable as desired. Numeral 48 designates a receiving piece provided at the edges of the saucer 45 to prevent the spill of powder discharged from the mortar 3. Instead of the receiving piece 48, the upper edge 45b of the saucer 45 may be formed slightly higher than that shown in the figure.

Next, a geared motor, for example, is used as the drive unit 6 as described above. The geared motor operates on commercial AC power, for example. In this embodiment, the motor case 13 of the drive unit 6 forms part of the movable frame 9 as described above. Instead of this structure, the member 13 of the movable frame 9 may be made completely independent of the drive unit 6, and the case or frame of the drive unit 6 may be mounted on the member 13. In the motor case 13, a mechanism for generating rotation and reduction gears for reducing the speed of the generated rotation are built in to constitute the drive unit 6. Numeral 50 designates the rotation shaft of the drive unit 6, that is, an output shaft used to output the rotation, the speed of which is reduced. A projection piece 51 is provided on part of the peripheral surface of the rotation shaft 50 to transmit rotation power to the upper mortar 5. The rotation speed of the rotation shaft 50 is in the range of 30 to 200 r.p.m, for example. The rotation shaft 50 is inserted into the through hole 42 of the upper mortar 5, and the upper mortar 5 is secured to the rotation shaft 50 with a tightening screw 52.

Next, the usage condition of the pulverizer 1 is described below. First, in a condition wherein the upper mortar 5 and the lower mortar 4 are set horizontal as shown in FIG. 1, that is, in a condition wherein the center lines 5c and 4c thereof are set vertical, the plug 41 is opened, material, such as tea leaves 53, is supplied into the supply hole 39, and the plug 41 is closed. A power supply switch (not shown) is then turned on to supply electric power to the drive unit 6. The drive unit 6 is operated, the rotation shaft 50 is rotated, and the upper mortar 5 is rotated in the direction indicated by arrow 54 shown in FIG. 4. By the rotation of the upper mortar 5, the tea leaves 53 supplied into the supply hole 39 are fed into the gap between the pulverizing surfaces 37 and 31 via the material guide groove 40 owing to a friction force generated by contact to the pulverizing surface 31 of the lower mortar 4 as the upper mortar 5 is rotated. In this case, when the rotation speed of the upper mortar 5 is high and the tea leaves 53 are subjected to a centrifugal force generated by the rotation, the tea leaves 53 are also fed into the gap between both pulverizing surfaces 37, 31 via the material guide 40 by the centrifugal force. The tea leaves 53 fed into the gap between the pulverizing surfaces 37, 31 are moved between the pulverizing surfaces 37, 31 to their outer peripheral sections, while the tea leaves 53 are pulverized or ground down by the crossing and sliding actions of the grooves 38, 32 provided on both pulverizing surfaces 37, 31. In this case, since the pulverizing surface 31 has a concave conical shape and the direction of the surface to its outer peripheral section has an upward gradient $\theta$ 2 (upward gradient $\theta$ 2 is an angle between the horizontal plane and the pulverizing surface 31 when the pulverizer is operated. In this operation condition, since the center line 4c of the lower mortar 4 is vertical, the upward gradient $\theta$ 2 is equal to the above-mentioned slope angle $\theta$ 1 at any portion of the entire periphery of the pulverizing surface 31.), the tea leaves 53 are repeatedly moved toward the outer peripheral section 31a and returned toward the central section 31b on the pulverizing surface 31. In other words, as the upper mortar 5 is rotated, the tea leaves 53 are moved upward along the upward gradient of the concave conical pulverizing surface 31 toward the outer peripheral section as described above. During the movement, the tea leaves 53 are ground down by the pulverizing surfaces 37, 31. When the tea leaves 53, which have been ground down into powder having a grain size smaller than the gap G between the pulverizing surfaces 37, 31 by grinding, are not pushed any more from the inside toward the outer peripheral section because spaces are formed inward from the areas where the powder is present, or because of other reasons, the tea leaves 53 slip down along the concave conical pulverizing surface 31 toward its central section. The tea leaves 53 then join other tea leaves 53 which have been located close to the central section. The joined tea leaves 53 are moved toward the outer peripheral section as they are pulverized or ground again by both pulverizing surfaces 37, 31 as described above. The tea leaves 53 are thus repeatedly moved up and down as described above and retained in the gap between both pulverizing surfaces 37, 31 for an extended period of time. During the period, the tea leaves 53 are ground down continuously. The tea leaves 53 are thus pulverized into finer powder while being moved gradually toward the outer peripheral section.

After the pulverization is completed, the finished powder is taken out as described below. The rotation of the upper mortar 5 driven by the drive unit 6 is stopped once by turning off the power switch. The movable frame 9 is inclined to a position wherein a portion 31d of the pulverizing surface 31 of the lower mortar 4 has a downward gradient, in other words, to a position wherein a portion 31a', the lowest portion of the outer peripheral section 31a of the pulverizing surface 31, is lower than the central section 31b. In the case of this embodiment wherein the slope angle θ 1 of the pulverizing surface 31 of the lower mortar 4 is 40 degrees, for example, the center lines 5c, 4c of the upper and lower mortars 5, 4 are inclined about 60 degrees, for example, from the vertical direction. The upper mortar 5 is then rotated again by the drive unit 6. The powder (powdered tea leaves) having already been pulverized and finished is discharged smoothly outward from the gap between the pulverizing surfaces 31, 37 of the lower mortar 4 and the upper mortar 5 at the lowest portion 31a' as the upper mortar 5 is rotated and falls in the saucer 45. The lid 47 located at the lowest position is opened and the powdered tea leaves having fallen in the saucer 45 are taken out easily from the outlet 46.

Next, when the material is pulverized as described above, pulverization can be performed in a condition that the lower mortar 4 is inclined so that the upward gradient at a portion of the pulverizing surface 31 of the lower mortar 4 is smaller than that in the condition shown in FIG. 1. To accomplish this, the movable frame 9 is inclined in the right or left direction from the position shown in FIG. 1. The portion of the pulverizing surface 31, which is positioned downward by inclining the movable frame 9, therefore, has a gentle upward gradient. When the material is pulverized in this condition as described above, at the portion having the gentle upward gradient, the degree of slipping of the pulverized material toward the central section 31b of the inclined pulverizing surface 31 is less than the degree of slipping in the case of the pulverization in the condition shown in FIG. 1. For this reason, at the above-mentioned portion, the movement speed of the pulverized material toward the outer peripheral section 31a of the pulverizing surface 31 is made higher than that obtained in the condition shown in FIG. 1, and the time during which the material is retained and ground down between the pulverizing surfaces 31, 37 is shortened. As a result, the powder delivered to the outer peripheral section of the pulverizing surface 31 after the pulverization is slightly larger in grain size than that obtained in the condition shown in FIG. 1. Since the slope angle of the lower mortar 4 can be changed, the upward gradient at the portion of the pulverizing surface 31, which is positioned downward, can be changed. By increasing or decreasing the gradient, the time during which the material is ground down between the pulverizing surfaces 31, 37 can be lengthened or shortened. As a result, it is possible to obtain powder with a small grain size or powder with a slightly larger grain size. Accordingly, it is desired that the slope angle should be set depending on the type of material to be pulverized or on a desired grain size. It is also desired that the angle of inclination of the lower mortar 4 should be set in a range up to an angle wherein the portion positioned downward is set in the horizontal direction so that the material can slip down along the pulverizing surface 31 toward its central section 31b. If the portion positioned downward has a downward gradient, coarse grains may be discharged through the downward gradient portion.

Next, a pulverizer of another embodiment of the invention is described below referring to FIG. 8. As another example of a means for relatively rotating the upper and lower mortars, this pulverizer is equipped with a drive unit for rotating the lower mortar. In the figure, the base section 60a of a support rod 60 is secured to a base frame 2e. An upper mortar 5e is mounted on a step section 61 disposed at the middle section of the support rod 60 and secured by tightening a fixing nut 62 screwed to the tip of the support rod 60. On the other hand, a lower mortar 4e, having a through hole 63 for allowing the support rod 60 to pass, is rotatably mounted on the base frame 2e via a bearing 64. On the bottom surface of the lower mortar 4e, a gear 65 rotated by a drive unit 6e is provided. The gear 65 has a through hole 66 for allowing the support rod 60 to pass. The drive unit 6e built in the base frame 2e is mounted on the base frame 2e, and a gear 68 mounted on a rotation shaft 50e for delivering rotation power engages the gear 65.

The pulverizer performs pulverization just as in the case of the pulverizer of the above-mentioned embodiment. More specifically, the material supplied in a material supply hole 39e is fed from the supply hole 39e to the gap between pulverizing surfaces 31e, 37e as the lower mortar 4e is rotated by the drive unit 6e, and ground down into powder by pulverization at the pulverizing surfaces 31e, 37e, then discharged from the outer peripheral ends of both pulverizing surfaces 31e, 37e.

Figure 8:
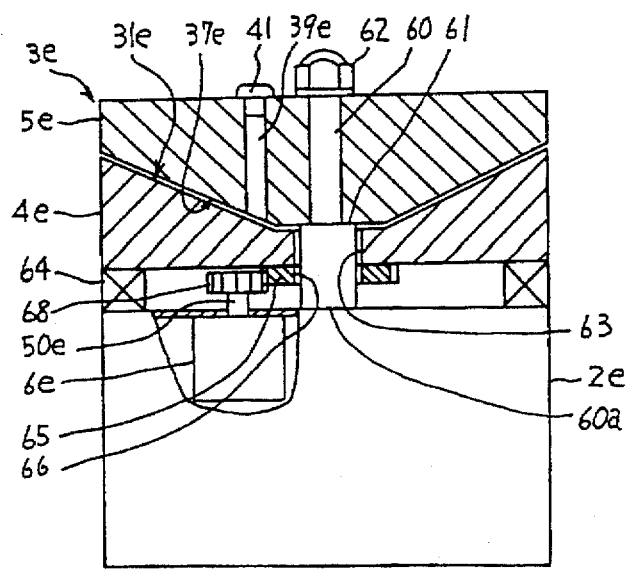
FIG. 8 is a partial cutaway front view showing a pulverizer of a second embodiment of the invention.
Figure 9:
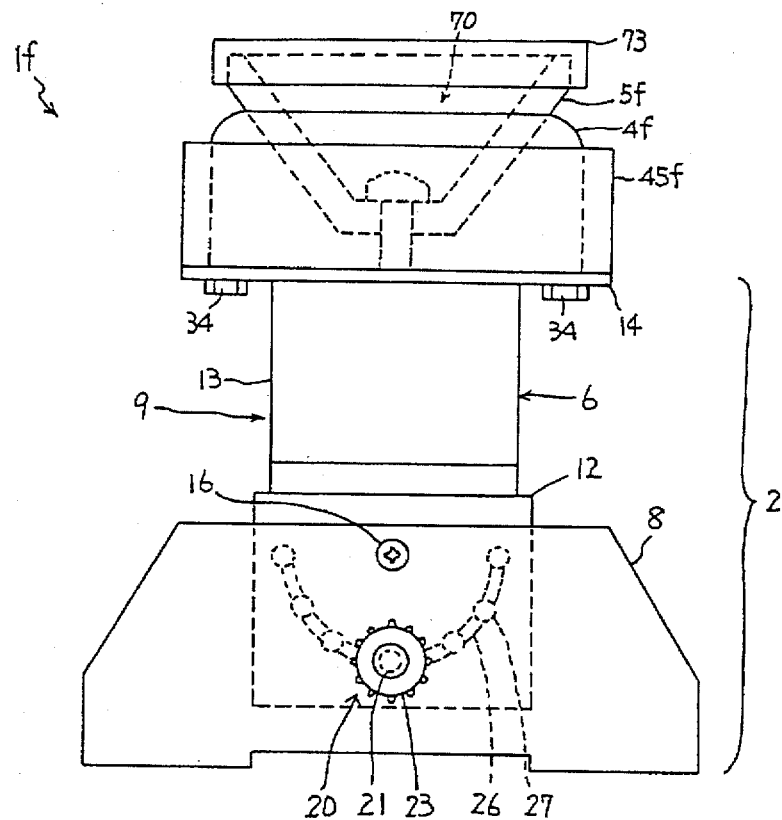
FIG. 9 is a front view showing a pulverizer of a third embodiment of the invention.
Figure 10:
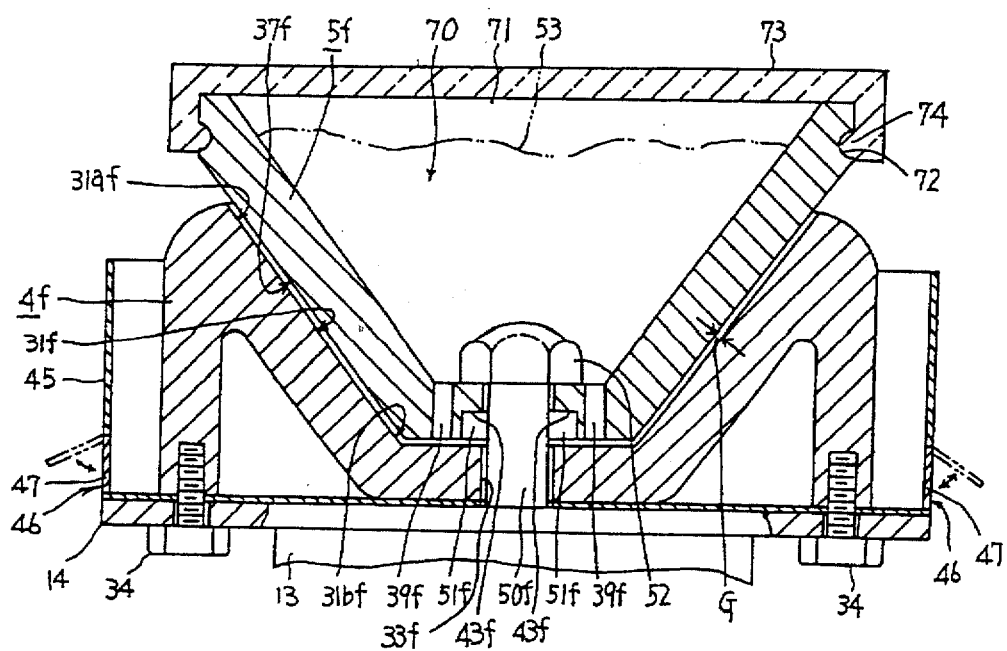
FIG. 10 is an enlarged vertical sectional view showing the main section of the pulverizer shown in FIG. 9.
Figure 11:
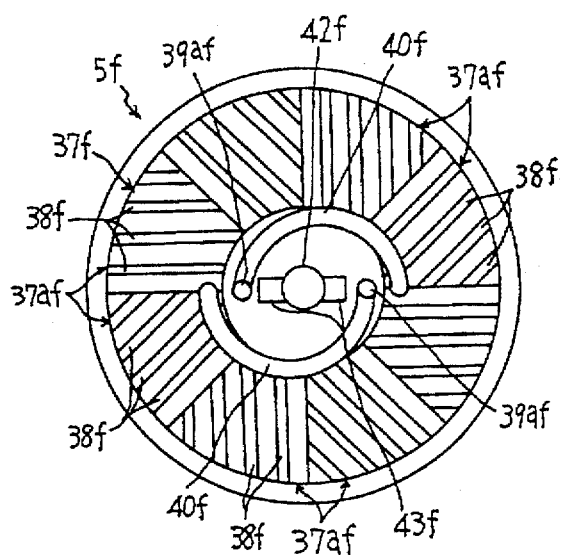
FIG. 11 is a bottom view showing the upper mortar of the pulverizer shown in FIG. 9.
Figure 12:
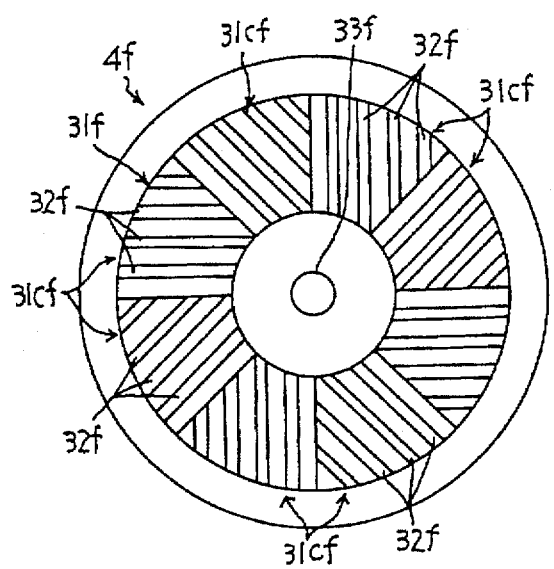
FIG. 12 is a plan view showing the lower mortar of the pulverizer shown in FIG. 9.
Figure 13:
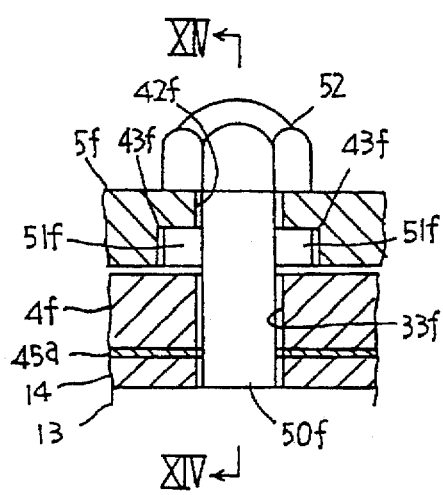
FIG. 13 is a vertical sectional view showing the relationship between the rotation shaft of the drive unit and the upper and lower mortars of the pulverizer.

In FIG. 8, like reference characters are assigned to designate parts having the same structures as those of the parts shown in the figures for the first embodiment. Furthermore, parts assumed to have functions identical to those of the first embodiment are designated by adding alphabet character "e" to the numerals used in the figures for the first embodiment and they are not explained here to avoid overlaps of explanation. (In the figures referred to hereinafter, like reference characters are assigned to designate like parts on the basis of the same thought. Parts assumed to have functions identical to those of the parts of the first embodiment are designated by adding alphabet characters f, g, . . . to the numerals used in the figures for the first embodiment, and they are not explained to avoid overlaps of explanation.)

Figure 14:
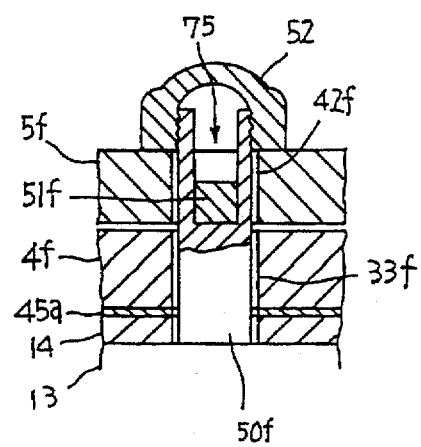
FIG. 14 is a sectional view taken on line XIV—XIV of FIG. 13.

Next, a pulverizer of another embodiment of the invention is explained below referring to FIGS. 9 to 14. This pulverizer has a lower mortar 4f and an upper mortar 5f having structures different from those of the above-mentioned embodiment. Referring to the figures, the pulverizing surface 31$f$ of the lower mortar 4$f$ is formed in a concave conical shape, the slope angle of which is made larger (55 degrees for example) than that of the above-mentioned embodiment. On the other hand, the upper mortar 5$f$ has a storage space 70 for storing material to be pulverized. The inner peripheral surface of the upper mortar 5$f$ is formed in the shape of a funnel which matches the conical shape of a pulverizing surface 37$f$ as shown in the figures so that the space 70 has as large capacity as possible. In addition, a material supply hole 39$f$ is communicated with the narrowest lower end of the funnel-shaped space 70 so that the material stored therein can be moved smoothly to the material supply hole 39$f$. The upper end 71 of the space 70 is opened in a wide range, in the entire range as shown in the figures, for example, so that the material can be put easily into the space and the material having been stored can be seen easily. Numeral 72 designates a concave fitting section provided on the outer peripheral surface of the upper mortar 5$f$ and used to secure a lid. Numeral 73 designates a lid for covering the open section of the upper end 71 to prevent the material from dropping from the space 70. The lid 73 is made of see-through material, such as transparent synthetic resin, so that the material stored in the space 70 can be seen. As the synthetic resin, polyethylene, nylon, polypropylene, etc. can be used. When the material inside the space 70 is not required to be seen, non-transparent synthetic resin, wood, metal, etc. may be used. Numeral 74 is a member for securing the lid 73 to the upper mortar 5$f$. In this embodiment, the member 74 is exemplified as a convex fitting section, which uses the elasticity of the lid 73 so that the convex fitting section can removably fit the concave fitting section 72. An ordinary stopping structure, such as a structure using a spring engagement member or a screw engagement structure, can be used as the removable stopping structure for the lid 73 which is used to cover the upper mortar 5$f$. A projection piece 51$f$ for transmitting the rotation power of the rotation shaft 50$f$ of the drive unit is fit into an accommodation groove 75 formed at the tip of the rotation shaft 50$f$ as shown in FIG. 14.

When material is pulverized by the above-mentioned pulverizer, the lid 73 is opened, the material is supplied into the space 70 and the lid 73 is closed. The pulverizer is then operated just as in the case of the above-mentioned embodiments. In this case, a large amount of material can be stored in the large space 70 beforehand. During pulverization, since the stored material is fed continuously from the storage space 70 to the pulverizing surfaces 31$f$, 37$f$ through the material supply hole 39$f$, the pulverizing operation can be carried out continuously and efficiently. In addition, since the rate of material reduction in the storage space 70 can be seen through the lid 73 during pulverization, the material can be replenished promptly when the amount of the material becomes scarce. Furthermore, in the case of the pulverization described above, since the slope angle of the pulverizing surfaces 31$f$, 37$f$ is large, there is a high possibility that the material having been moved toward the outer peripheral surface 31$af$ of the pulverizing surface 31$f$ is slipped down toward the central section 31$bf$ of the pulverizing surface 31$f$. For this reason, the period of time during which the material is retained between the pulverizing 31$f$, 37$f$ is extended, thereby enabling finer pulverization of the material. Moreover, in the above-mentioned pulverizer, the material can be pulverized while the lower mortar 4$f$ and the upper mortar 5$f$ are inclined just as in the case of the above-mentioned embodiments. In this case, the lid 73 prevents the material from dropping from the storage space 70.

Figure 15:
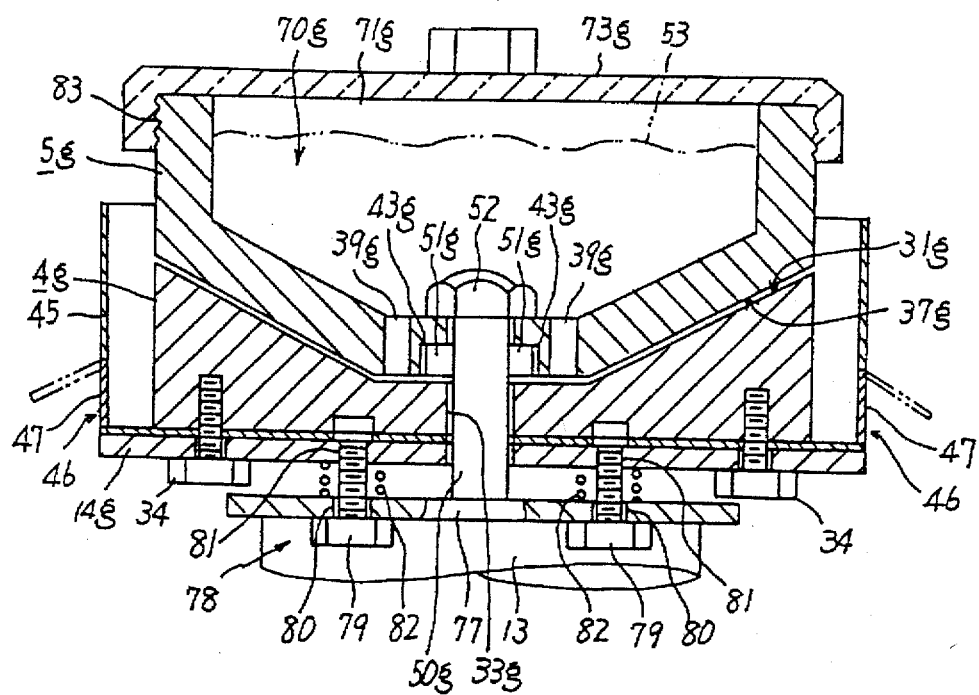
FIG. 15 is a vertical sectional view showing the main section of a pulverizer of a fourth embodiment of the invention.
Figure 16:
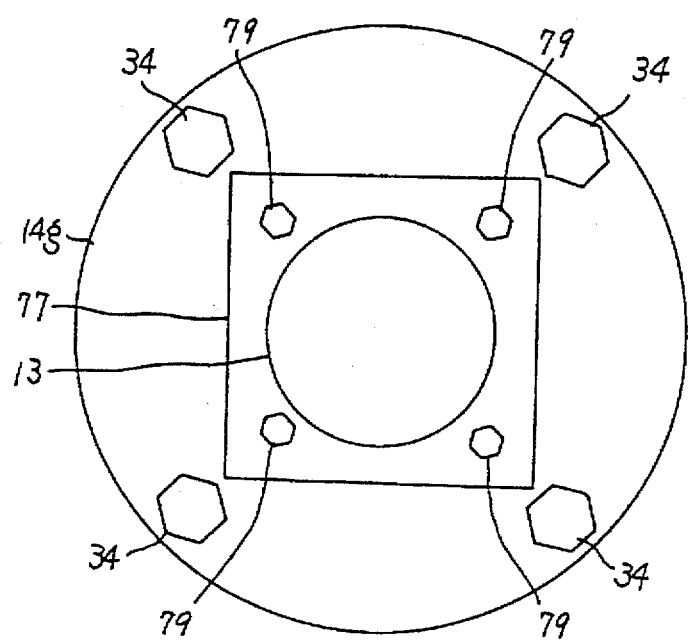
FIG. 16 is a bottom view showing the relationship between the mounting flange and the mounting base of the pulverizer shown in FIG. 15.

Next, a pulverizer of a further different embodiment of the invention is described below referring to FIGS. 15 and 16. In this pulverizer, a pulverizing pressure adjustment means for adjusting pulverizing pressure applied to the material from the pulverizing surfaces 31$g$, 37$g$, when material is pulverized between the pulverizing surface 31$g$ of a lower mortar 4$g$ and the pulverizing surface 37$g$ of an upper mortar 5$g$, is provided. The adjustment of the pulverizing pressure is carried out so that the most suitable pulverization can be performed depending on the grain size of powder generated by the pulverization of the material or on the type of material to be pulverized. In the figures, numeral 77 designates a mounting flange, which is secured to a motor case 13. A mounting base 14$g$ is made movable as desired close to and away from the mounting flange 77. Numeral 78 designates a pulverizing pressure adjustment means for adjusting the above-mentioned pulverizing pressure, and the adjustment means 78 comprising members designated by reference numerals 78, 82 is exemplified. Numeral 79 designates a pressure adjustment member, and the adjustment member 79 comprising a bolt for adjusting the pulverizing pressure is exemplified. The adjustment member 79 is also used as a connection member for connecting the mounting base 14$g$ to the mounting flange 77. In this case, the adjustment member 79 is inserted into a through hole 80 provided in the mounting flange 77 and the tip of the adjustment member 79 is screwed in a threaded hole 81 provided in the mounting base 14$g$. Numeral 82 designates an energizing member for energizing the lower mortar 4$g$ toward the upper mortar 5$g$. The energizing member is exemplified by a compression coil spring and interposed between the mounting flange 77 and the mounting base 14$g$. A spring having a spring force capable of sufficiently energizing the lower mortar 4$g$ upward against the weights of the mounting base 14$g$, the saucer 45 and the lower mortar 4$g$ is used as the spring 82. In this embodiment, a lid 73$g$ is removably screwed on the upper mortar 5$g$ at a screw section 83.

In case of pulverization by using the pulverizer having the above-mentioned structure, pressure (this pressure is referred to as "pulverizing pressure" in the present specification) applied to the material interposed between the pulverizing surfaces 31$g$, 37$g$ from the pulverizing surfaces 31$g$, 37$g$ can be adjusted by using the pulverizing pressure adjustment means 78. In other words, the pulverizing pressure can be decreased when the pulverizing surface 31$g$ of the lower mortar 4$g$ is moved away from the pulverizing surface 37$g$ of the upper mortar 5$g$ by rotating the adjustment member 79. Conversely, the pulverizing pressure can be increased when the pulverizing surface 31$g$ of the lower mortar 4$g$ is moved close to the pulverizing surface 37$g$ of the upper mortar 5$g$. When the pulverizing pressure is low, the degree of pulverization of material between both pulverizing surfaces 31$g$, 37$g$ decreases and the grain size of powder obtained by pulverization is relatively large. Conversely, when the pulverizing pressure is high, the degree of pulverization increases and the grain size of powder obtained is small. Accordingly, a desired grain size can be obtained by adjusting the adjustment member 79. During ordinary use, the adjustment is desirably conducted at the initial stage of pulverization of desired material while monitoring pulverization conditions (the time required for pulverization and the grain condition of generated powder) so that powder having a desired grain size can be obtained.

Figure 17:
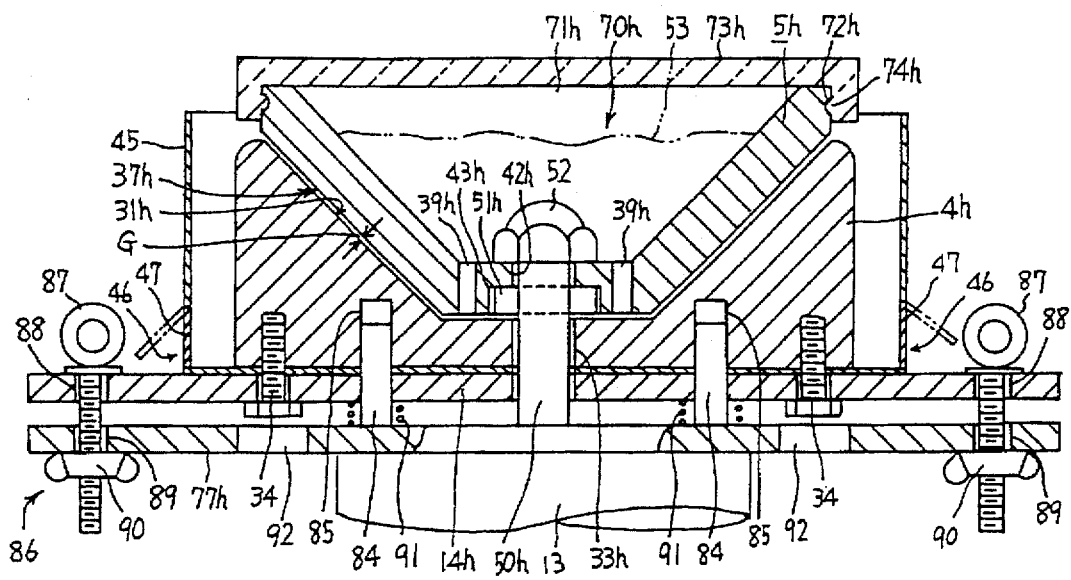
FIG. 17 is a vertical sectional view showing the main section of a pulverizer of a fifth embodiment of the invention.
Figure 18:
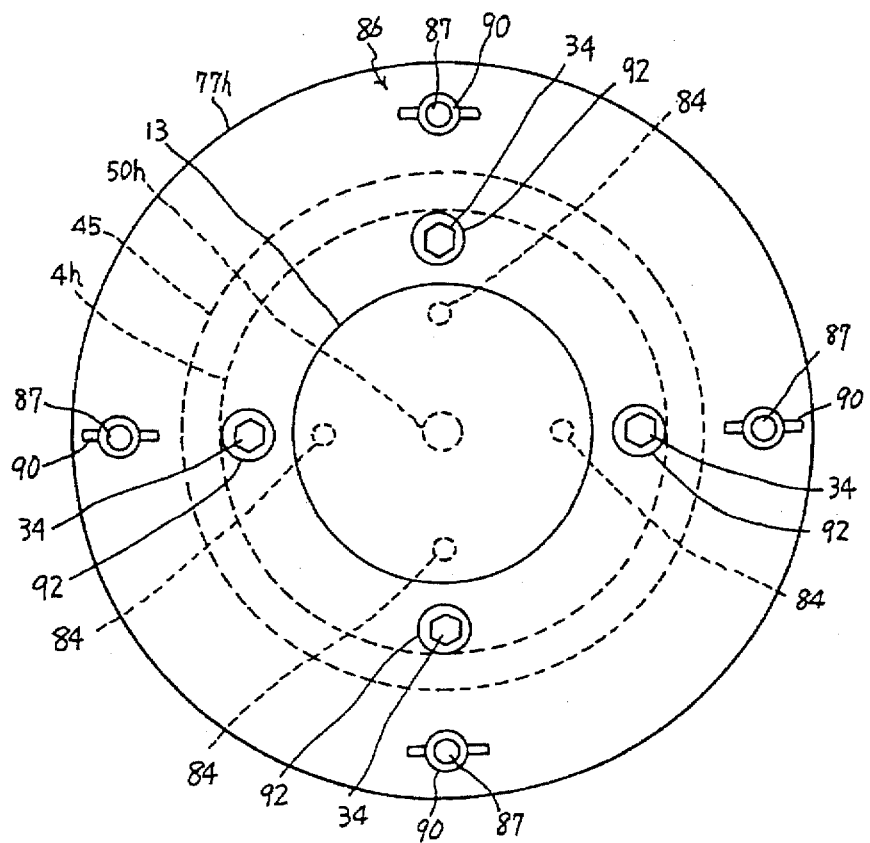
FIG. 18 is a bottom view of the mounting flange of the pulverizer shown in FIG. 17.

Next, a pulverizer of a still further embodiment of the invention is described below referring to FIGS. 17 and 18. This pulverizer is provided with a gap adjustment means for adjusting the gap G between the pulverizing surface 31$h$ of a lower mortar 4h and the pulverizing surface 37h of an upper mortar 5h. The gap is adjusted so that the most suitable pulverization can be performed depending on the grain size of powder generated by pulverization or on the type of material to be pulverized. In the figures, the gap G is adjusted by moving the pulverizing surface 31h of the lower mortar 4h close to or away from the pulverizing surface 37h of the upper mortar 5h. As an example of a means for the adjustment, the upper section of a guide pin 84, the lower end of which is secured to a mounting flange 77h, is movably inserted in a guide hole 85 formed in the mounting base 14h, the saucer 45 and the lower mortar 4h, and the lower mortar 4h is movable up and down along the guide pin 84. The guide pin 84 functions to determine the lateral position of the lower mortar 4h with respect to the mounting flange 77h. A gap adjustment means 86 for adjusting the gap G between the pulverizing surface 31h of the lower mortar 4h and the pulverizing surface 37h of the upper mortar 5h comprising members designated by numerals 87, 90 and 91 is exemplified. Numeral 87 designates a connection member for connecting the mounting flange 77h and the mounting base 14h, and an eyebolt is exemplified. The eyebolts 87 are inserted into the through holes 88, 89 provided in the mounting base 14h and the mounting flange 77h respectively, and an adjustment member 90 (a wing nut is exemplified) exemplified as a means for adjusting the gap is screwed on the eyebolt 87. Numeral 91 designates an energizing member for energizing the lower mortar 4h upward toward the upper mortar 5h, and the energizing member 91 is exemplified by a compression coil spring interposed between the mounting flange 77h and the mounting base 14h. A spring having a spring force capable of sufficiently energizing the lower mortar 4h further upward against the weights of the mounting base 14h and the lower mortar 4h is used as the spring 91.

In the above-mentioned structure, when the adjustment member 90 is rotated in its tightening direction with respect to the connection member 87, the mounting base 14h is moved close to the mounting flange 77h, and the pulverizing surface 31h of the lower mortar 4h is moved away from the pulverizing surface 37h of the upper mortar 5h, thereby increasing the gap G between the pulverizing surface 31h and the pulverizing surface 37h. Conversely, when the adjustment member 90 is rotated in its loosening direction, the mounting base 14h is moved away from the mounting flange 77h, the pulverizing surface 31h of the lower mortar 4h is moved close to the pulverizing surface 37h of the upper mortar 5h, thereby decreasing the gap G between the pulverizing surface 31h and the pulverizing surface 37h. When the gap G is large, the degree of pulverizing material between the pulverizing surfaces 31h, 37h decreases and the grain size of powder generated by pulverization is large. Conversely, when the gap G is small, the degree of pulverizing material between the pulverizing surfaces 31h, 37h increases and the grain size of powder generated by pulverization is small. Accordingly, when material is pulverized, powder having a desired grain size can be obtained by adjusting the adjustment means 90. The adjustment of the gap G can also be used to obtain powder having a desired grain size depending on the type of material to be pulverized. Numeral 92 is a through hole provided in the mounting flange 77h for tightening operation of the bolt 34.

Figure 19:
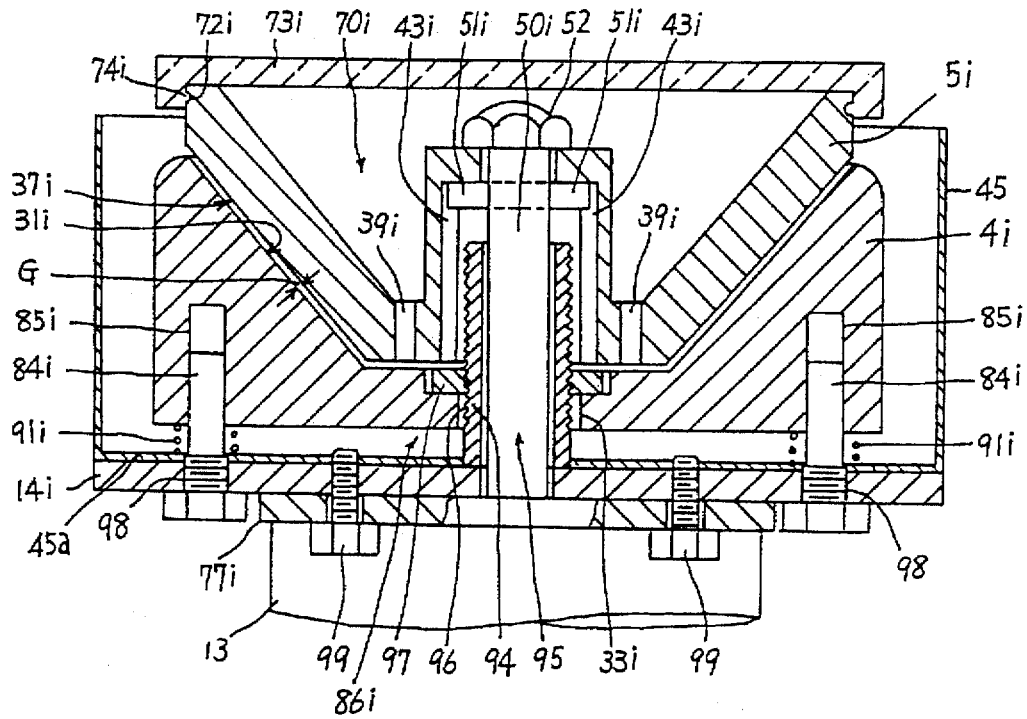
FIG. 19 is a vertical sectional view showing the main section of a pulverizer of a sixth embodiment of the invention.

Next, a pulverizer of a still further embodiment of the invention is described below referring to FIG. 19. A different example of a means for displacing a lower mortar 4i to adjust the gap G is exemplified. Referring to the figure, a gap adjustment means 86i includes a guide cylinder 94, one end of which is mounted on a mounting base 14i. A rotation shaft 50i is inserted into the hollow section 95 of the guide cylinder 94. A nut 97 exemplified as the positioning member of a lower mortar 4i is screwed on a threaded section 96 formed on the outer peripheral surface of the guide cylinder 94. A bolt-shaped guide pin is used as a guide pin 84i and screwed in the threaded hole 98 formed in the mounting base 14i. The guide pin 84i functions to determine the lateral position of the lower mortar 4i with respect to the mounting base 14i. Numeral 99 designates a bolt for securing the mounting base 14i to the mounting flange 77i.

The gap G in the pulverizer having the above-mentioned structure is adjusted as described below. A lid 73i is removed, a tightening screw 52 is removed, and the upper mortar 5i is taken out upward from the rotation shaft 50i. Next, when the nut 97 is rotated in its tightening or loosening direction, the lower mortar 4i is moved downward or upward respectively along the guide pin 84i. In this case, the nut 97 can be rotated in the condition that the lower mortar 4i is pushed down by hand against a spring 91i to facilitate the rotation of the nut 97. After the lower mortar 4i is moved as described above, the upper mortar 5i is mounted on the rotation shaft 50i and secured with the tightening screw 52. This completes the adjustment of the gap G. In the case of this adjustment, since the upper mortar 5i is secured to the rotation shaft 50i with a predetermined relationship offered between them, the gap G increases when the lower mortar 4i is moved downward, and the gap G decreases when the lower mortar 4i is moved upward.

Figure 20:
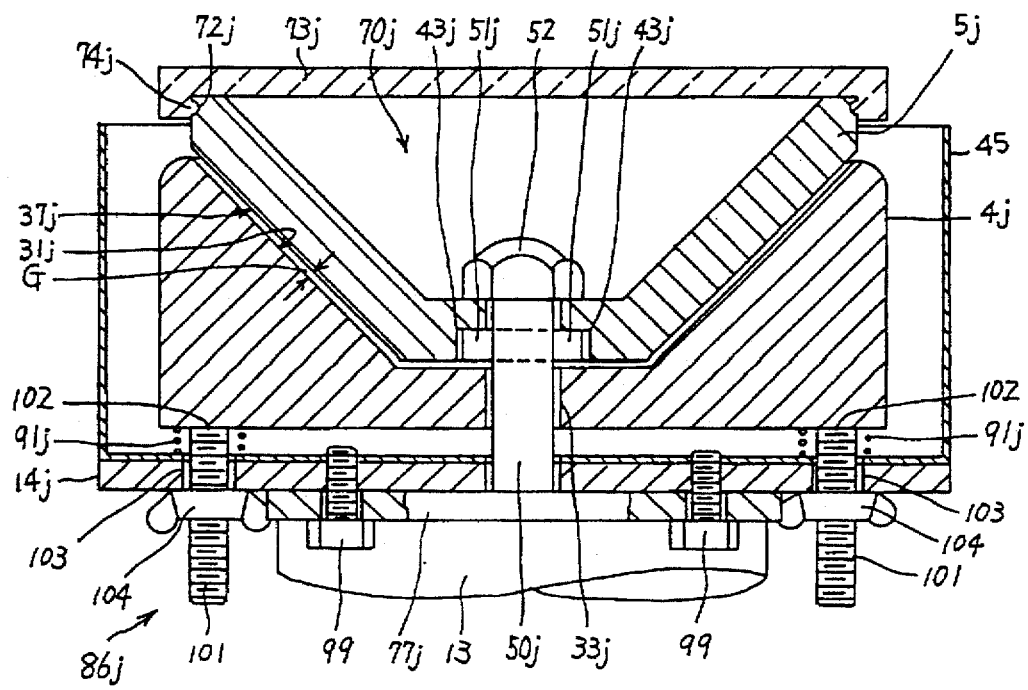
FIG. 20 is a vertical sectional view showing the main section of a pulverizer of a seventh embodiment of the invention.

Next, a pulverizer of a yet further embodiment is described below referring to FIG. 20. A different example of a means for displacing a lower mortar 4j to adjust the gap G is exemplified in this embodiment. Referring to the figure, a gap adjustment means 86j has connection members 101 for connecting the lower mortar 4j to a mounting base 14j. As the connection member 101, a stud bolt secured to the bottom surface of the lower mortar 4j is exemplified. The stud bolt 101 is inserted into a through hole 103 provided in a mounting base 14j, and a wing nut 104 exemplified as a member for adjusting the gap G is screwed on the stud bolt 101.

The gap G in the pulverizer having the above-mentioned structure is adjusted as described below. When the wing nut 104 is rotated in its tightening direction, the lower mortar 4j is moved downward, and the gap G can thus be increased. When the wing nut 104 is rotated in its loosening direction, the lower mortar 4j is moved upward, and the gap G can thus be decreased.

Figure 21:
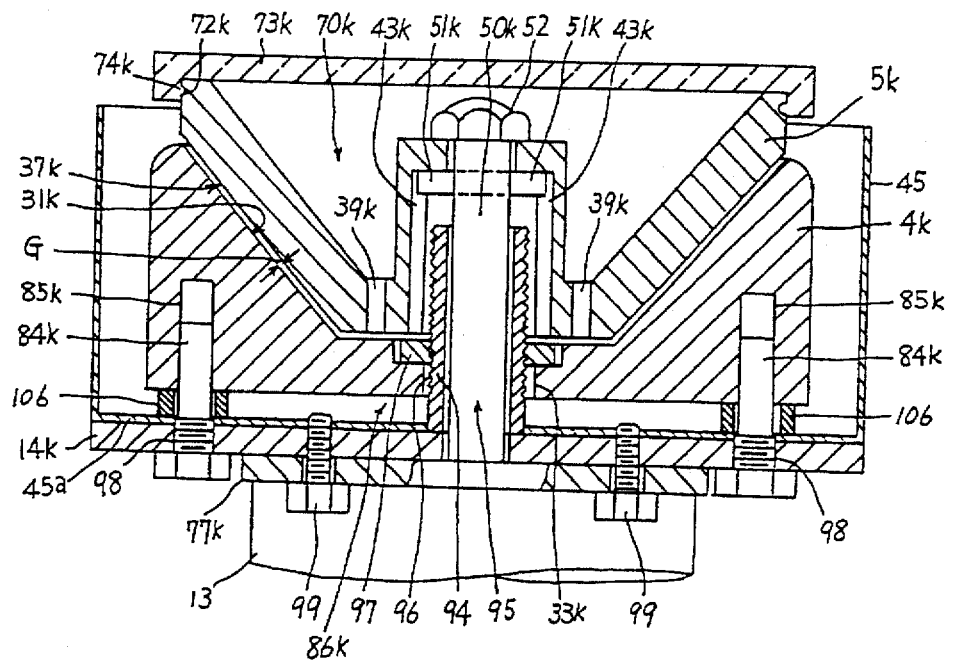
FIG. 21 is a vertical sectional view showing the main section of a pulverizer of an eighth embodiment of the invention.
Figure 22A:
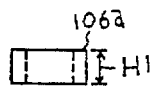
FIGS. 22A, 22B and 22C are front views showing large, medium and small spacers for space adjustment.
Figure 22B:
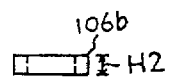
Figure 22C:
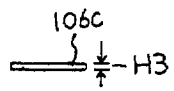

Next, a pulverizer of a still yet further embodiment is described below referring to FIG. 21. In the pulverizer having a structure similar to that shown in FIG. 19, instead of the spring 91i, a spacer 106 for gap adjustment is exemplified. The spacer 106 is formed in a cylindrical shape, fit on a guide pin 84k and interposed between the bottom surface of a lower mortar 4k and the top surface of the bottom plate 45a of the saucer 45. As the spacer 106, a plurality of spacers 106a to 106c having different heights H1 to H3 respectively are prepared as shown in FIGS. 22A to 22C. The gap G can be adjusted by replaceably mounting these spacers at the positions of the spacers 106 shown in FIG. 21.

The gap G in the pulverizer having the above-mentioned structure is adjusted as described below. First, a lid 73k, a tightening screw 52 and an upper mortar 5k are taken out just as in the case of the pulverizer shown in FIG. 19. Next, a projection piece 51k and a nut 97 is removed, and the lower mortar 4k is taken out. The spacers 106 are then replaced. The gap change operation is completed by mounting all removed members by reversing the above removing steps.

Figure 23:
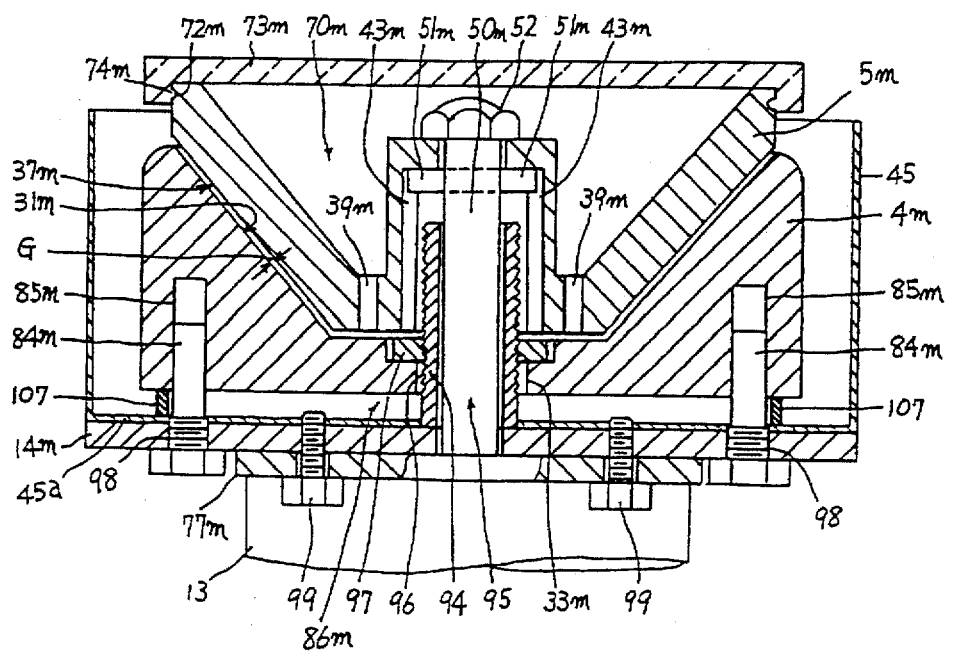
FIG. 23 is a vertical sectional view showing the main section of a pulverizer of a ninth embodiment of the invention.

Next, a pulverizer of yet another embodiment of the invention is described below referring to FIG. 23. In the pulverizer having a structure similar to that shown in FIG. 21, instead of the spacer 106 fit on each guide pin 84k, a spacer 107 having a large diameter and surrounding all guide pins 84m is exemplified in this embodiment. As the spacer 107 having the large diameter, a plurality of spacers having different heights are prepared just as in the case of the above-mentioned spacer 106. The gap G can be adjusted by replaceably mounting these spacers.

Figure 24:
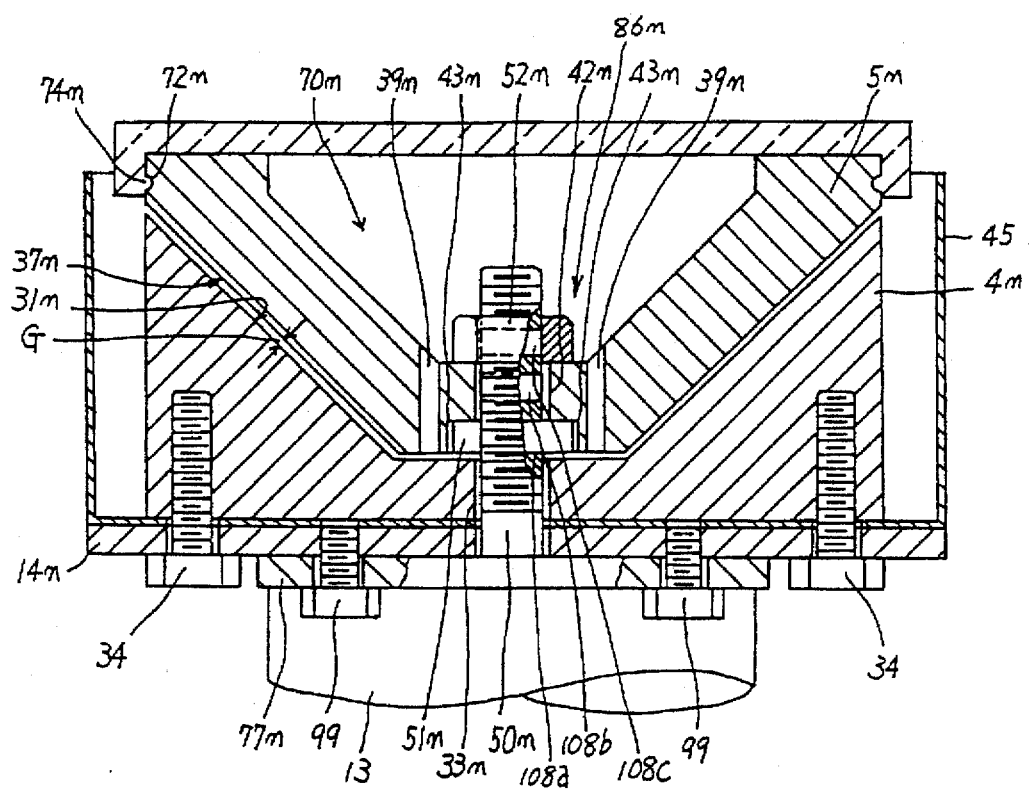
FIG. 24 is a vertical sectional view showing the main section of a pulverizer of a tenth embodiment of the invention.
Figure 25:
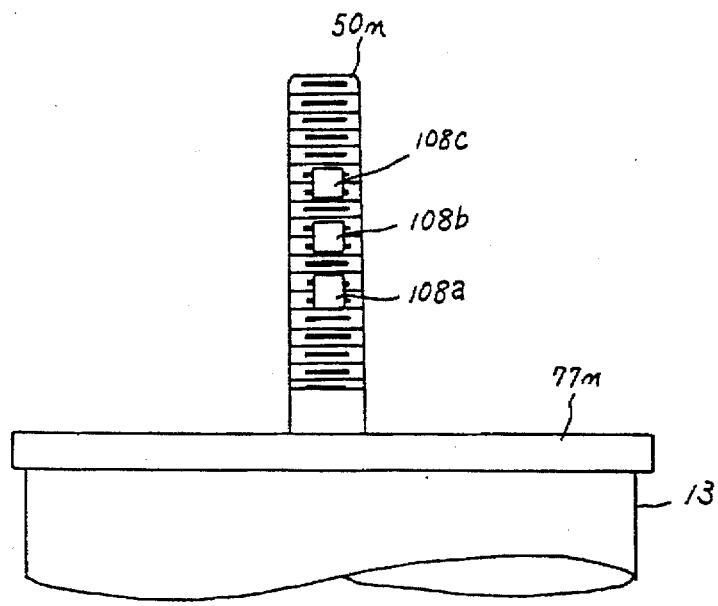
FIG. 25 is a side view of the rotation axis of the drive unit shown in FIG. 24.

Next, a pulverizer of still yet another embodiment of the invention is described below referring to FIGS. 24 and 25. In this embodiment, a gap adjustment means 88n is structured to adjust the gap G by changing the position of an upper mortar 5n. In the figures, a rotation shaft 50n is provided with a plurality of insertion holes 108a to 108c to allow a projection piece 51n to be replaceably inserted and disposed at different positions one another in the axial direction. The gap G is changed by selecting an insertion hole into which the projection piece 51n is to be inserted. More specifically, when the projection piece 51n is inserted into the bottom insertion hole 108a, the gap G is made smallest, and the material can be ground down into powder having a small grain size. When the projection piece 51n is inserted into the middle insertion hole 108b, the gap is made medium, and the material can be ground to powder having a medium grain size. When the projection piece 51n is inserted into the top insertion hole 108c, the gap G is made largest, and the material can be ground down into powder having a large grain size.

The gap G can be changed as described below. A lid 73n is removed, a tightening screw 52n is removed, and the upper mortar 5n is taken out upward. The insertion position of the projection piece 51n is changed. After this, the change operation is completed by remounting the upper mortar 5n, the tightening screw 52n and the lid 73n.

Although desk-top type pulverizers are shown as all the embodiments of the invention described above, large ground-installation type pulverizers having the above-mentioned structures may also be adopted.

What is claimed is:

1. A pulverizer comprising:

(a) a base frame;

(b) a lower mortar having a first pulverizing surface on an upper surface thereof and disposed on said base frame;

(c) a ceramic upper mortar having a second pulverizing surface on a lower surface thereof and disposed on said base frame, with said first pulverizing surface facing said second pulverizing surface; and (d) a drive unit disposed on said base frame for rotating said upper mortar;

(e) said second pulverizing surface having a concave conical shape, an outer peripheral section of which is higher than a central section thereof;

(f) said first pulverizing surface having an inverse conical shape matching said concave conical shape of said lower mortar;

(g) an upper side of said upper mortar having a funnel-like concave shape on an inner peripheral surface thereof providing a storage space for storing material to be pulverized;

(h) a material supply hole for supplying material to be pulverized from said storage space disposed closely adjacent a rotation center shaft at the bottom of said upper mortar;

(i) a plurality of spirally-shaped grooves on both said first and second pulverizing surfaces coupled to said material supply hole for supplying said material and facing opposite to each other extending in an outer peripheral direction to move material to be pulverized to said pulverizing surface in the direction from the central lower section to an upper outer peripheral section of said pulverizing surfaces, the extension directions of said plural grooves on both said pulverizing surfaces intersecting one another while said grooves are facing opposite to one another so that, when material supplied from said material supply hole at the bottom of said upper mortar is pulverized between said pulverizing surfaces, the material enters the lower section of said opposed pulverizing surfaces of said upper and lower mortars, is moved upward along the upward gradient of said pulverizing surfaces, and is discharged from the upper outer peripheral section of said pulverizing surfaces.

2. A pulverizer according to claim 1, wherein said lower mortar can be inclined as desired so that the upward gradient at a portion of said pulverizing surface thereof can be made gentle in order to change the grain size of powder generated by pulverizing the material.

3. A pulverizer according to claim 2, wherein said lower mortar can be inclined to a position where a portion of said pulverizing surface becomes horizontal.

4. A pulverizer according to claim 1, wherein said lower mortar can be inclined to a position where a portion of said pulverizing surface has a downward gradient in order to allow powder generated by pulverizing the material to flow outward.

5. A pulverizer according to claim 1, wherein a pulverizing pressure adjustment means for adjusting the pressure generated when the material is pulverized between said pulverizing surface of said lower mortar and said pulverizing surface of said upper mortar and applied from said pulverizing surfaces to the material is provided.

6. A pulverizer according to claim 1, wherein a gap adjustment means for adjusting the gap between said pulverizing surface of said lower mortar and said pulverizing surface of said upper mortar is provided.

7. A pulverizer according to claim 1, wherein said storage space in said upper mortar is open upward and a removable lid for allowing the interior of said storage space to be seen through is mounted on said storage space.

* * * * *